US009986050B2

(12) United States Patent
Brooks et al.

(10) Patent No.: US 9,986,050 B2
(45) Date of Patent: *May 29, 2018

(54) UPDATING TIME-RELATED INFORMATION IN POST TO MAKE IT MORE RELEVANT FOR THE REQUESTER ON SUBSEQUENT RETRIEVAL OF POST

(71) Applicant: International Business Machines Corporation, Armonk, NY (US)

(72) Inventors: David A. Brooks, Arlington, MA (US); Jeffrey N. Eisen, Newton, MA (US); Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 999 days.

This patent is subject to a terminal disclaimer.

(21) Appl. No.: 13/969,714

(22) Filed: Aug. 19, 2013

(65) Prior Publication Data
US 2015/0052199 A1    Feb. 19, 2015

(51) Int. Cl.
*G06F 17/30* (2006.01)
*H04L 29/08* (2006.01)
*H04L 12/58* (2006.01)

(52) U.S. Cl.
CPC .............. *H04L 67/22* (2013.01); *H04L 51/26* (2013.01); *H04L 51/32* (2013.01); *G06F 17/30731* (2013.01); *G06F 17/30734* (2013.01)

(58) Field of Classification Search
CPC ......... G06F 17/30174; G06F 17/30867; G06F 17/30056; G06F 17/5022
USPC ................................................. 707/769, 770
See application file for complete search history.

(56) References Cited

U.S. PATENT DOCUMENTS

| 5,790,974 | A | 8/1998 | Tognazzini |
| 7,069,003 | B2 | 6/2006 | Lehikoinen et al. |
| 7,082,402 | B2 * | 7/2006 | Conmy et al. ............... 705/7.19 |
| 7,814,405 | B2 | 10/2010 | Kumar et al. |

(Continued)

OTHER PUBLICATIONS

Office Action for U.S. Appl. No. 13/971,422 dated Jun. 29, 2015, pp. 1-12.

(Continued)

*Primary Examiner* — James Trujillo
*Assistant Examiner* — Fariborz Khoshnoodi
(74) *Attorney, Agent, or Firm* — Robert A. Voigt, Jr.; Winstead, P.C.

(57) ABSTRACT

A method, system and computer program product for updating the time-related information in a post to make it more relevant for the requester on a subsequent retrieval of the post. A post with a reference to an event or activity (e.g., "leaving for Florida in 3 days") is identified using natural language processing. Upon receiving a request from a requester to retrieve the post prior to the expiration of the event/activity, the post is updated by substituting a time countdown in the post with an up-to-date time countdown or with a current status of the referenced event/activity. If, however, the request is received after the expiration of the event/activity, then the post is removed or updated with an indication that the referenced event/activity has expired. In this manner, the requester will be receiving more accurate and relevant time-related information concerning the event or activity referenced in the post.

16 Claims, 4 Drawing Sheets

(56) References Cited

U.S. PATENT DOCUMENTS

| | | | |
|---|---|---|---|
| 8,560,013 B2* | 10/2013 | Jotanovic | H04W 4/003 455/414.2 |
| 2003/0227386 A1 | 12/2003 | Pulkkinen et al. | |
| 2007/0106627 A1* | 5/2007 | Srivastava | G06Q 10/10 706/20 |
| 2009/0164569 A1 | 6/2009 | Garcia et al. | |
| 2009/0282087 A1 | 11/2009 | Muller et al. | |
| 2010/0036924 A1* | 2/2010 | Naamani | H04L 51/36 709/206 |
| 2012/0054115 A1* | 3/2012 | Baird-Smith et al. | 705/319 |
| 2012/0297312 A1 | 11/2012 | Lance et al. | |
| 2014/0129324 A1* | 5/2014 | Spivack et al. | 705/14.45 |

OTHER PUBLICATIONS

Office Action for U.S. Appl. No. 13/971,422 dated Oct. 26, 2015, pp. 1-15.
Office Action for U.S. Appl. No. 13/971,422 dated Oct. 5, 2016, pp. 1-19.
Office Action for U.S. Appl. No. 13/971,422 dated Jul. 12, 2017, pp. 1-15.

* cited by examiner

UPDATING TIME-RELATED INFORMATION IN POST TO MAKE IT MORE RELEVANT FOR THE REQUESTER ON SUBSEQUENT RETRIEVAL OF POST

TECHNICAL FIELD

The present invention relates generally to social network services, and more particularly to updating the time-related information (e.g., updating the time to the occurrence of an event or activity) in a post (e.g., status update, microblog, text-based message) to make it more relevant for the requester on a subsequent retrieval of the post.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

Social networking sites (e.g., Facebook®) present to a particular user the posts by other users in a social networking feed often referred to as an "activity stream." "Posts" can include text (e.g., comments, sub-comments and replies), audio, video images, etc. Often, these posts include a timeframe for the occurrence or completion of an event or activity. For example, the post of "traveling to Boston on Tuesday" indicates that the poster will be traveling to Boston on Tuesday. In another example, the post of "going to lunch—back in 30 minutes" indicates that the poster will be back from lunch in 30 minutes from the time of the posting of the post. In a further example, the post of "graduating in 3 days" indicates that the poster will be graduating in three days from the time of the posting of the post.

Currently, social networking sites do not update the status or timeframe for the occurrence or completion of these events or activities. Hence, when a requester requests the retrieval of a user's profile or user's activity stream that includes the post with time-related information, the post will continue to include the time information that the poster originally posted even though such information is outdated. For example, suppose that a requester is a follower of the poster who retrieves their activity stream that includes a post made yesterday that states that the poster will be "graduating in 3 days." However, since the post was made yesterday, the poster will not be graduating in three days but in two days.

As a result, posts with time-related information that are later retrieved by other users will not include up-to-date timing or status information for the occurrence or completion of an event or activity mentioned in the post that would make the post more accurate and relevant for the requester.

BRIEF SUMMARY

In one embodiment of the present invention, a method for updating a post with time-related information to make it more relevant to a requester on subsequent retrieval of the post comprises identifying a post with a reference to an event or activity using natural language processing. The method further comprises extracting a time the post was initially posted and an identification of the referenced event or activity from the identified post. The method additionally comprises extracting a time countdown from the identified post and/or metadata associated with the referenced event or activity comprising time-related information of the referenced event or activity. Furthermore, the method comprises storing the post, the extracted time the post was initially posted, the extracted identification of the referenced event or activity as well as the extracted time countdown and/or the extracted metadata associated with the referenced event or activity. Additionally, the method comprises identifying a current time in response to a request to retrieve the post from the requester. In addition, the method comprises updating the stored post by substituting the extracted time countdown with an up-to-date time countdown or updating the stored post with a current status of the extracted referenced event or activity. The method further comprises providing, by a processor, the updated post to the requester.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
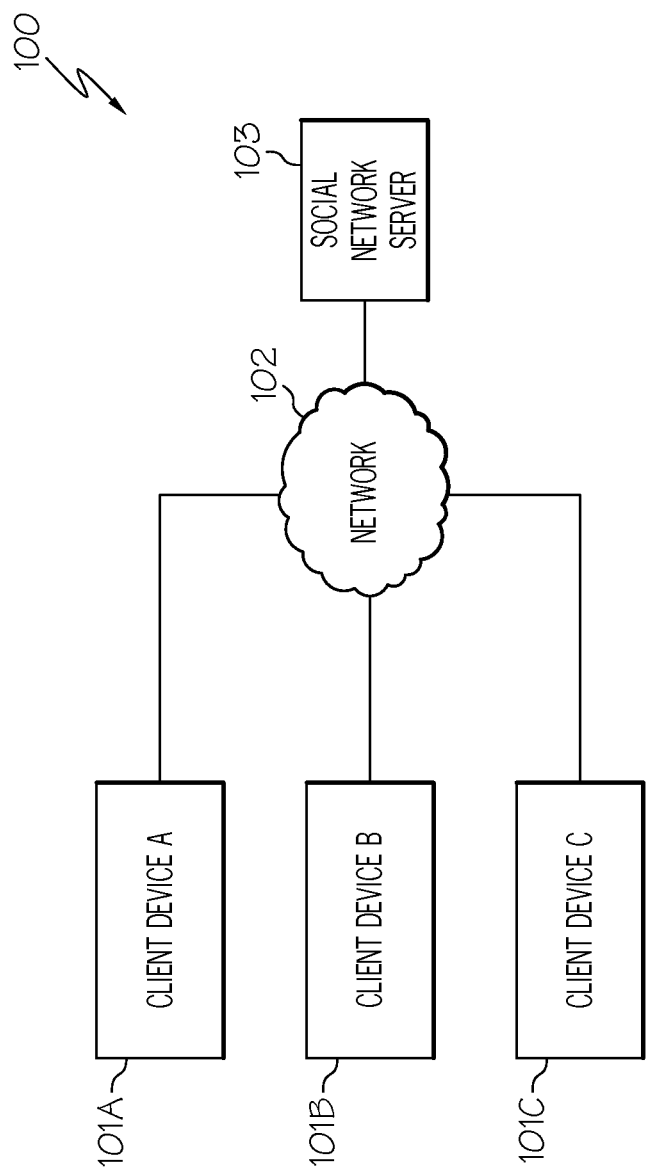
FIG. 1 illustrates a social network system configured in accordance with an embodiment of the present invention.

The present invention comprises a method, system and computer program product for updating the time-related information in a post to make it more relevant for the requester on a subsequent retrieval of the post. In one embodiment of the present invention, a post with a reference to an event or activity (e.g., "leaving for Florida in 3 days") is identified using natural language processing. The time that the post was initially posted, an identification of the referenced event or activity (e.g., "leaving for Florida") as well as a time countdown (if included in the post) (e.g., "3 days") is extracted from the post. Furthermore, metadata associated with the referenced event or activity (e.g., start time, end time, an identifier (e.g., Uniform Resource Locator (URL)), and a description (e.g., title)) is extracted if such information is available. The post and the extracted information are stored. Upon receiving a request from a requester to retrieve the post, the stored post is updated by substituting the extracted time countdown with an up-to-date time countdown (e.g., initial post of "leaving for Florida in 3 days" may be updated with the post of "leaving for Florida in 2 days" to reflect the fact that a day has transpired since the initial posting of the post) or updating the stored post with a current status of the referenced event or activity (e.g., initial post of "getting ready for sales meeting in 2 hours" may be updated with the post of "in sales meeting" to reflect the fact that more than two hours has transpired since the initial posting of the post but the end time of the meeting has not yet been reached) if the time countdown or the end time of the referenced event or activity has not expired. If, however, the time countdown or the end time of the referenced event or activity has expired, then the post is removed, such as from the user's profile page or from the user's activity stream, or updated with an indication that the time countdown has expired or that the end time of the referenced event or activity has expired (e.g., initial post of "leaving for Florida in 3 days" may be updated with the post of "left for Florida" to reflect the fact that more than three days has transpired since the initial posting of the post) based on the procedures for handling posts when the time countdown expires or when the referenced event or activity expires. In this manner, the requester will be receiving more accurate and relevant time-related information concerning the event or activity referenced in the post.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include a status update, microblog or text-based message that includes any one or more of the following: text (e.g., comments, sub-comments and replies), audio, video images, etc. A user of client device 101 that posts or sends a post is said to be a "poster." A user of client device 101 that requests to retrieve a post issued by the poster is said to be a "requester." Social network server 103 is connected to network 102 by wire or wirelessly. While FIG. 1 illustrates a single social network server 103, it is noted for clarity that multiple servers may be used to implement the social networking and/or microblogging service. A description of the hardware configuration of social network server 103 is provided below in connection with FIG. 2.

System 100 is not to be limited in scope to any one particular network architecture. System 100 may include any number of client devices 101, networks 102 and social network servers 103.

Figure 2:
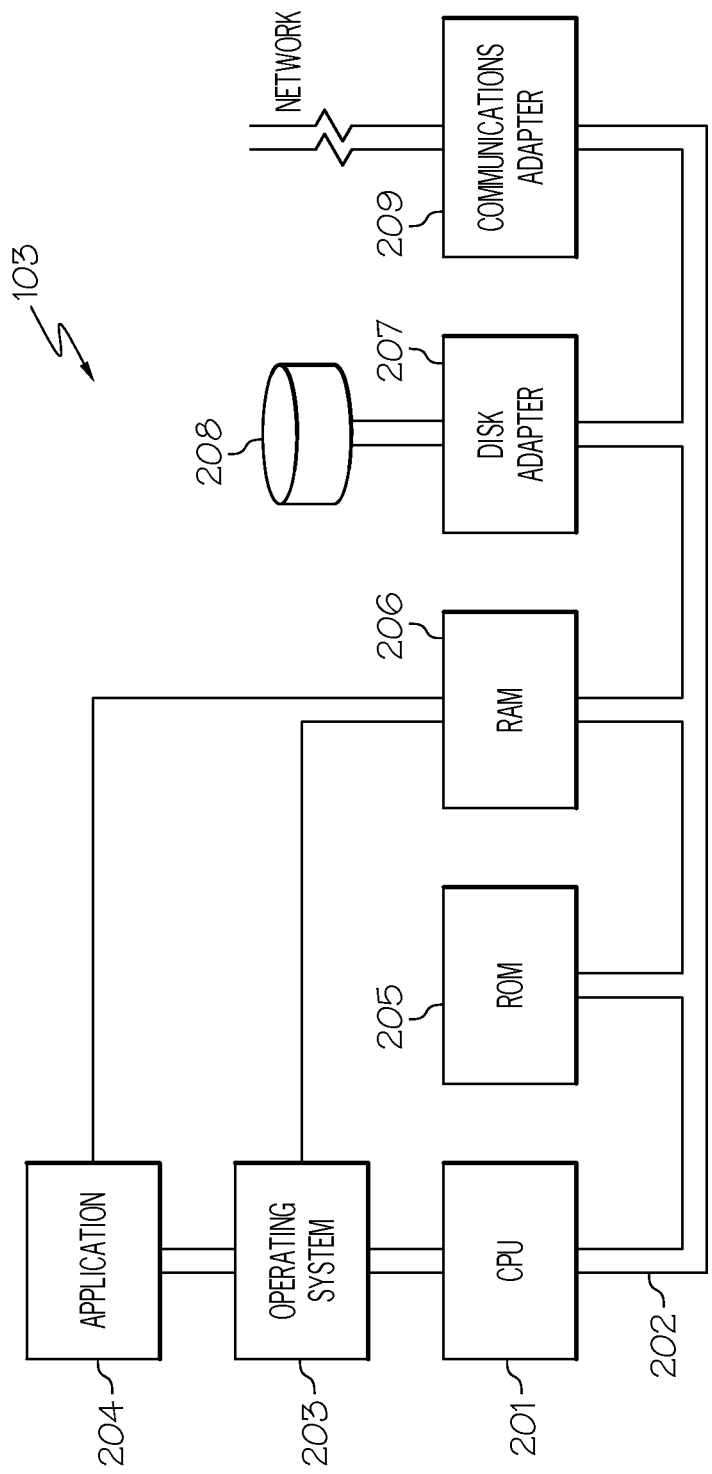
FIG. 2 illustrates a hardware configuration of a social network server configured in accordance with an embodiment of the present invention.

Referring now to FIG. 2, FIG. 2 illustrates a hardware configuration of social network server 103 (FIG. 1) which is representative of a hardware environment for practicing the present invention. Referring to FIG. 2, social network server 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for updating the time-related information (e.g., updating the time to the occurrence of an event or activity) in a post (e.g., status update, microblog, text-based message) to make it more relevant for the requester on a subsequent retrieval of the post, as discussed further below in association with FIGS. 3A-3B.

Referring again to FIG. 2, read-only memory ("ROM") 205 is coupled to system bus 202 and includes a basic input/output system ("BIOS") that controls certain basic functions of social network server 103. Random access memory ("RAM") 206 and disk adapter 207 are also coupled to system bus 202. It should be noted that software components including operating system 203 and application 204 may be loaded into RAM 206, which may be social network server's 103 main memory for execution. Disk adapter 207 may be an integrated drive electronics ("IDE") adapter that communicates with a disk unit 208, e.g., disk drive. It is noted that the program for updating the time-related information in a post to make it more relevant for the requester on a subsequent retrieval of the post, as discussed further below in association with FIGS. 3A-3B, may reside in disk unit 208 or in application 204.

Social network server 103 may further include a communications adapter 209 coupled to bus 202. Communications adapter 209 interconnects bus 202 with an outside network (e.g., network 102 of FIG. 1) thereby allowing social network server 103 to communicate with client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, social networking sites (e.g., Facebook®) present to a particular user the posts by other users in a social networking feed often referred to as an "activity stream." "Posts" can include text (e.g., comments, sub-comments and replies), audio, video images, etc. Often, these posts include a timeframe for the occurrence or completion of an event or activity. For example, the post of "traveling to Boston on Tuesday" indicates that the poster will be traveling to Boston on Tuesday. In another example, the post of "going to lunch—back in 30 minutes" indicates that the poster will be back from lunch in 30 minutes from the time of the posting of the post. In a further example, the post of "graduating in 3 days" indicates that the poster will be graduating in three days from the time of the posting of the post. Currently, social networking sites do not update the status or timeframe for the occurrence or completion of these events or activities. Hence, when a requester requests the retrieval of a user's profile or user's activity stream that includes the post with time-related information, the post will continue to include the time information that the poster originally posted even though such information is outdated. For example, suppose that a requester is a follower of the poster who retrieves their activity stream that includes a post made yesterday that states that the poster will be "graduating in 3 days." However, since the post was made yesterday, the poster will not be graduating in three days but in two days. As a result, posts with time-related information that are later retrieved by other users will not include up-to-date timing or status information for the occurrence or completion of an event or activity mentioned in the post that would make the post more accurate and relevant for the requester.

The principles of the present invention provide a means for updating the time-related information (e.g., updating the time to the occurrence of an event or activity) in a post (e.g., status update, microblog, text-based message) to make it more relevant for the requester on a subsequent retrieval of the post as discussed further below in association with FIGS. 3A-3B.

Figure 3A:
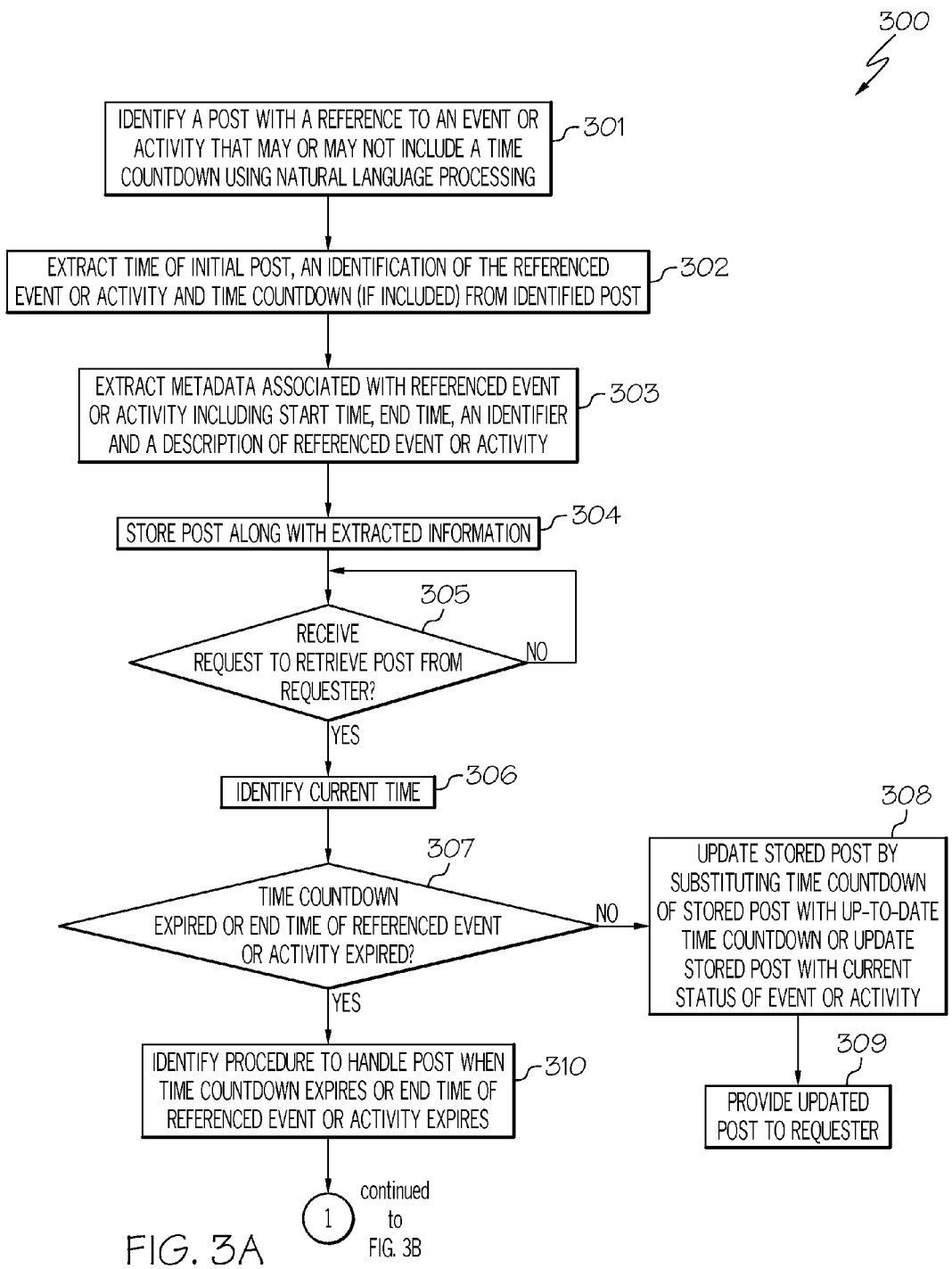
FIGS. 3A-3B are a flowchart of a method for updating a post with time-related information to make it more relevant to a requester on subsequent retrieval of the post in accordance with an embodiment of the present invention.
Figure 3B:
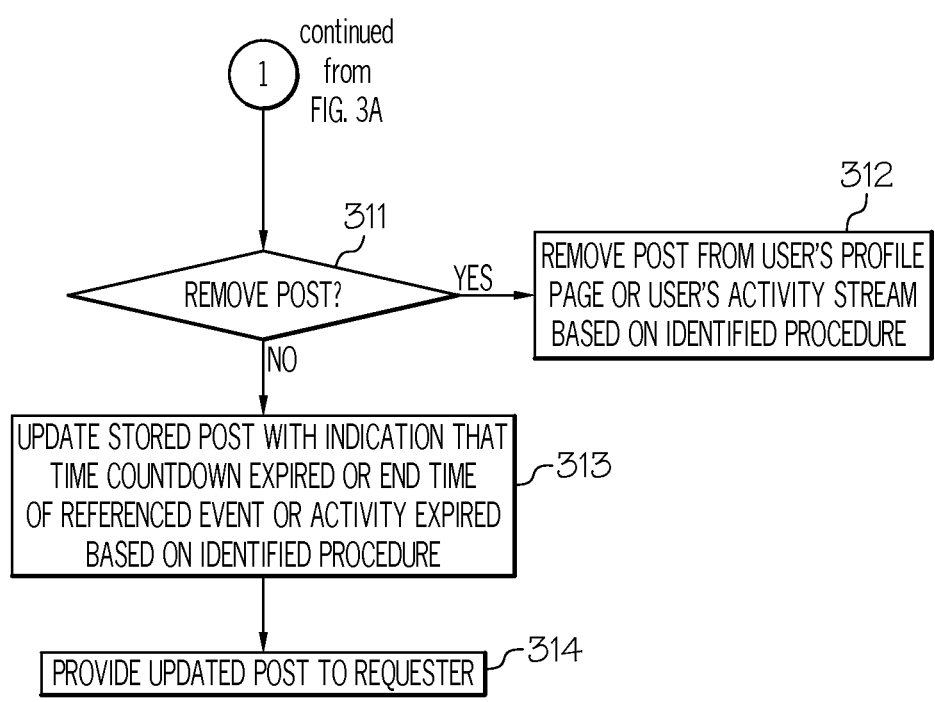

FIGS. 3A-3B are a flowchart of a method 300 for updating a post with time-related information to make it more relevant for a requester on subsequent retrieval of the post in accordance with an embodiment of the present invention. "Time-related" information, as used herein, refers to a duration of time for an event or activity to occur or be completed, including, but not limited to, a time countdown. A "time countdown," as used herein, refers to a duration of time (e.g., three days) specified in the post for an event or activity to occur or be completed.

Referring now to FIG. 3A, in conjunction with FIGS. 1-2, in step 301, social network server 103 identifies a post that includes a reference to an event or activity, where the post may or may not include a specific time countdown, using natural language processing. Examples of posts that include a time countdown, include, but not limited to, "leaving for Florida in 3 days" or "3 days until graduation." A set of patterns representing time countdowns may be identified in the posts using natural language processing, such as the patterns of "in <x><units>" or "<x><units> until," where <x> is a value, such as a positive number. Examples of posts that reference an event or activity without including a time countdown, include, but not limited to, "getting ready for team meeting," and "listening to a sales presentation." While such references may not include a specific time countdown, such events or activities may be scheduled in the poster's calendar. As a result, as will be discussed further below, social network server 103 may be able to obtain time-related information associated with these references to events or activities that do not include a specific time countdown by linking through analytics to the poster's calendar to extract time-related information, such as the start time, the end time, an identifier (e.g., Uniform Resource Locator (URL)), and a description (e.g., title) of the referenced event or activity. A set of patterns representing references to events or activities that do not include a specific time countdown may be identified in the posts using natural language processing, such as the patterns of "listening to <event>," "preparing for <event>," or "meeting with <person>."

In step 302, social network server 103 extracts the time that the post (post identified in step 301) was initially posted, an identification of the referenced event or activity (e.g., the term "meeting" in the post, the action "leaving for" in the post) as well as a time countdown (if included) from the posted identified in step 301. For example, in the post "leaving for Florida in 3 days," social network server 103 may extract the time that the post "leaving for Florida in 3 days" was initially posted by the poster. Social network server 103 may also extract the identification of the event/activity (e.g., "leaving for Florida") and the time countdown (e.g., "3 days") from the post.

In step 303, social network server 103 extracts metadata associated with the referenced event or activity, such as the start time, the end time, an identifier (e.g., Uniform Resource Locator (URL)), and a description (e.g., title) of the referenced event or activity if such information is available to be extracted. As discussed above, such metadata may be extracted from the poster's calendar entry associated with the referenced event or activity.

In step 304, social network server 103 stores the post along with the extracted information (e.g., information extracted in steps 302 and 303), such as in disk unit 208.

In step 305, a determination is made by social network server 103 as to whether it received a request to retrieve the post (post identified in step 301 and stored in step 304) from a requester. For example, the requester may request retrieval of the post via a request for retrieving the user's profile page containing the post or via a request for retrieving the user's activity stream containing the post.

If social network server 103 has not received a request to retrieve the post, then social network server 103 continues to determine whether it received a request to retrieve the post in step 305.

If, however, social network server 103 receives a request to retrieve the post, then, in step 306, social network server 103 identifies the current time.

In step 307, a determination is made by social network server 103 as whether the time countdown expired or the end time of the referenced event or activity has expired in light of the current time. For example, if the user posted a post that indicated that the user was "leaving for Florida in 2 hours" and more than two hours has transpired since the initial posting of the post, then the time countdown of "2 hours" has elapsed or expired. In another example, if a user posted a post that indicated that the user was "getting ready for the meeting" and the user's calendar indicates that the meeting is from 1:00-2:00 pm, then the end time of the referenced event or activity has expired if the current time is past 2:00 pm.

If the time countdown or the end time of the referenced event or activity has not expired, then, in step 308, social network server 103 updates the stored post by substituting the time countdown of the stored post with an up-to-date time countdown or updates the stored post with a current status of the event or activity. For example, the poster's initial post of "leaving for Florida in 3 days" may be updated with the post of "leaving for Florida in 2 days" to reflect the fact that a day has transpired since the initial posting of the post. In another example, the poster's initial post of "getting ready for sales meeting in 2 hours" may be updated with the post of "getting ready for sales meeting in 1 hour" to reflect the fact that an hour has transpired since the initial posting of the post. In a further example, the poster's initial post of "getting ready for sales meeting in 2 hours" may be updated with the post of "in sales meeting" to reflect the fact that more than two hours has transpired since the initial posting of the post but the end time of the meeting has not yet been reached (i.e., expired). In this manner, the requester will be receiving more accurate and relevant time-related information concerning the event or activity referenced in the post.

In step 309, social network server 103 provides the updated post to the requester. In one embodiment, the requester (user of client device 101) may additionally receive the extracted time-related information (e.g., time countdown, end time for the completion of the event or activity) thereby allowing the requester to dynamically update the post with the current time-related information without retrieving the post from social network server 103. Client device 101 has a hardware configuration similar to social network server 103 as shown in FIG. 2 (may further include various input/output devices, such as a keyboard, mouse, display and keyboard), such as a memory for storing an application for performing such updates as well as a processor for executing the instructions of the application. The aspects of the present invention in such an embodiment may be embodied as a system, method or computer program product as discussed herein.

If, however, the time countdown or the end time of the referenced event or activity has expired, then, in step 310, social network server 103 identifies the procedure to handle the post when the time countdown expires or when the referenced event or activity expires. Various procedures may be used to handle the situation when the time countdown has expired or when the end time of the event or activity has transpired (i.e., expired), such as removing the post from the user's profile page or from the user's activity stream or updating the post to indicate that the time countdown has expired or that the end time of the event or activity has expired (i.e., the event or activity has already occurred).

Such handling procedures may be established or overridden (in the case of default procedures) by the user (i.e., the poster).

Referring now to FIG. 3B, in conjunction with FIGS. 1-2, in step 311, a determination is made by social network server 103 as to whether the post is to be removed, such as removed from the user's profile page or from the user's activity stream.

If the post is to be removed, then, in step 312, social network server 103 removes the post, such as from the user's profile page or from the user's activity stream.

If, however, the post is not to be removed, then, in step 313, social network server 103 updates the stored post with an indication that the time countdown has expired or that the end time of the referenced event or activity has expired. For example, the poster's initial post of "leaving for Florida in 3 days" may be updated with the post of "left for Florida" to reflect the fact that more than three days has transpired since the initial posting of the post. In another example, the poster's initial post of "getting ready for sales meeting in 2 hours" may be updated with the post of "done with sales meeting" to reflect the fact that the end time of the meeting has been reached (i.e., expired). In this manner, the requester will be receiving more accurate and relevant time-related information concerning the event or activity referenced in the post.

In step 314, social network server 103 provides the updated post to the requester.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for updating a post with time-related information to make it more relevant to a requester on subsequent retrieval of the post, the computer program product comprising the programming instructions for:
    identifying a post with a reference to an event or activity using natural language processing;
    extracting a time said post was initially posted and an identification of said referenced event or activity from said identified post;
    extracting a time countdown from said identified post and/or metadata associated with said referenced event or activity comprising time-related information of said referenced event or activity;
    storing said post, said extracted time said post was initially posted, said extracted identification of said referenced event or activity as well as said extracted time countdown and/or said extracted metadata associated with said referenced event or activity;
    identifying a current time in response to a request to retrieve said post from said requester,
    updating said stored post by substituting said extracted time countdown with an up-to-date time countdown or updating said stored post with a current status of said extracted referenced event or activity; and
    providing said updated post to said requester.

2. The computer program product as recited in claim 1, wherein said metadata comprises one or more of the following: a start time, an end time, an identifier and a description of said referenced event or activity.

3. The computer program product as recited in claim 2, wherein said metadata is extracted from a calendar entry associated with said referenced event or activity.

4. The computer program product as recited in claim 1, wherein said retrieval of said post is in connection with a retrieval of a user's profile page containing said post.

5. The computer program product as recited in claim 1, wherein said retrieval of said post is in connection with a retrieval of a user's activity stream containing said post.

6. The computer program product as recited in claim 1 further comprising the programming instructions for:
    identifying a procedure to handle said post in response to said time countdown expiring or in response to an end time of said referenced event or activity expiring.

7. The computer program product as recited in claim 6 further comprising the programming instructions for:
    removing said post from a user's profile page or from a user's activity stream based on said identified procedure.

8. The computer program product as recited in claim 6 further comprising the programming instructions for:
    updating said stored post with an indication that said time countdown expired or said end time of said referenced event or activity expired based on said identified procedure.

9. A system, comprising:
    a memory unit for storing a computer program for updating a post with time-related information to make it more relevant to a requester on subsequent retrieval of the post; and
    a processor coupled to said memory unit, wherein said processor, responsive to said computer program, comprises:
        circuitry for identifying a post with a reference to an event or activity using natural language processing;
        circuitry for extracting a time said post was initially posted and an identification of said referenced event or activity from said identified post;
        circuitry for extracting a time countdown from said identified post and/or metadata associated with said referenced event or activity comprising time-related information of said referenced event or activity;
        circuitry for storing said post, said extracted time said post was initially posted, said extracted identification of said referenced event or activity as well as said extracted time countdown and/or said extracted metadata associated with said referenced event or activity;
        circuitry for identifying a current time in response to a request to retrieve said post from said requester,
        circuitry for updating said stored post by substituting said extracted time countdown with an up-to-date time countdown or updating said stored post with a current status of said extracted referenced event or activity; and circuitry for providing said updated post to said requester.

10. The system as recited in claim 9, wherein said metadata comprises one or more of the following: a start time, an end time, an identifier and a description of said referenced event or activity.

11. The system as recited in claim 10, wherein said metadata is extracted from a calendar entry associated with said referenced event or activity.

12. The system as recited in claim 9, wherein said retrieval of said post is in connection with a retrieval of a user's profile page containing said post.

13. The system as recited in claim 9, wherein said retrieval of said post is in connection with a retrieval of a user's activity stream containing said post.

14. The system as recited in claim 9, wherein said processor further comprises:

circuitry for identifying a procedure to handle said post in response to said time countdown expiring or in response to an end time of said referenced event or activity expiring.

15. The system as recited in claim 14, wherein said processor further comprises:

circuitry for removing said post from a user's profile page or from a user's activity stream based on said identified procedure.

16. The system as recited in claim 14, wherein said processor further comprises:

circuitry for updating said stored post with an indication that said time countdown expired or said end time of said referenced event or activity expired based on said identified procedure.

* * * * *